United States Patent
Morrow et al.

(10) Patent No.: US 7,073,847 B2
(45) Date of Patent: Jul. 11, 2006

(54) DUPLEX DOOR FOR VEHICLE

(75) Inventors: Jon Morrow, Neenah, WI (US); Tim Meilahn, Oshkosh, WI (US); Dave Steinberger, Oshkosh, WI (US); Corey Voigt, Menasha, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 10/939,176

(22) Filed: Sep. 10, 2004

(65) Prior Publication Data

US 2006/0055206 A1    Mar. 16, 2006

(51) Int. Cl.
*B60J 7/00* (2006.01)
(52) U.S. Cl. .............. 296/190.11; 296/146.13
(58) Field of Classification Search ........... 296/190.11, 296/146.13; 49/125–128, 197–198, 201–202, 49/73.1, 103–104
See application file for complete search history.

(56) References Cited

U.S. PATENT DOCUMENTS

| | | | | |
|---|---|---|---|---|
| 1,302,742 A | * | 5/1919 | Weiss | 296/147 |
| 1,313,186 A | * | 8/1919 | Howard | 296/147 |
| 1,646,794 A | * | 10/1927 | Racz | 296/147 |
| 2,815,243 A | * | 12/1957 | Campbell | 296/190.11 |
| 3,131,923 A | * | 5/1964 | Werner et al. | 49/81.1 |
| 3,151,858 A | * | 10/1964 | Urquhart | 49/126 |
| 3,567,274 A | * | 3/1971 | Kaptur, Jr. et al. | 296/50 |
| 3,799,607 A | * | 3/1974 | Shakespear | 296/155 |
| 4,007,958 A | | 2/1977 | Peifer et al. | |
| 4,315,646 A | | 2/1982 | McReynolds | |
| 4,648,208 A | | 3/1987 | Baldamus et al. | |
| 4,778,193 A | | 10/1988 | Torcomian | |
| 4,850,636 A | | 7/1989 | McLaren et al. | |
| 4,887,659 A | | 12/1989 | West | |
| 4,914,863 A | | 4/1990 | Laukhuf | |
| 5,253,589 A | | 10/1993 | Kawanishi et al. | |
| 5,255,952 A | * | 10/1993 | Ehrlich | 296/146.13 |
| 5,295,527 A | | 3/1994 | West | |
| 6,068,327 A | | 5/2000 | Junginger | |
| 6,098,695 A | | 8/2000 | Schwingle | |
| 6,233,875 B1 | | 5/2001 | Carlo et al. | |
| 6,234,565 B1 | | 5/2001 | Bryant et al. | |
| 6,279,988 B1 | | 8/2001 | Muraro | |
| 6,318,782 B1 | | 11/2001 | Suzuki et al. | |
| 6,471,284 B1 | | 10/2002 | Landmesser | |
| 6,505,882 B1 | | 1/2003 | Morbach et al. | |
| 6,508,035 B1 | | 1/2003 | Seksaria et al. | |
| 6,543,829 B1 | | 4/2003 | Brown | |
| 6,554,346 B1 | | 4/2003 | Sugimoto | |
| 6,588,828 B1 | | 7/2003 | Fisher | |
| 6,655,698 B1 | * | 12/2003 | Nozaki et al. | 277/629 |
| 6,682,130 B1 | | 1/2004 | Lustig et al. | |

OTHER PUBLICATIONS

Freightliner®, "Condor", undated, (2 pgs.).

* cited by examiner

*Primary Examiner*—H. Gutman
(74) *Attorney, Agent, or Firm*—Foley & Lardner LLP

(57) ABSTRACT

A method and a vehicle door assembly for a vehicle with the vehicle having a cab frame. The vehicle door assembly comprises a door frame movably coupled to the cab frame. An upper door member is pivotally coupled to the door frame. The lower door member is movably coupled to the upper door member. The door frame is movable from a first position alongside the cab frame to a second position inside the cab frame. The upper door member is movable from a closed position to one of an open position and a stored position inside the cab frame.

26 Claims, 5 Drawing Sheets

DUPLEX DOOR FOR VEHICLE

BACKGROUND OF THE INVENTION

This invention relates to work vehicles and more particularly to work vehicles that require frequent ingress and egress to an occupant's area within the cab of the vehicle and specifically such activity is facilitated by maintaining a cab door in an open and stowed position.

Work vehicles such as refuse or waste hauling trucks, fire-fighting vehicles or other material hauling vehicles typically necessitate the driver or helper to move into and out of the cab of the vehicle and performing work. For example, a waste hauling work vehicle moving through a residential area makes frequent stops and the driver or helper must move in and out of the cab to collect the trash for deposit in the vehicle. The opening and closing of the cab door during this work process would place an undue duty cycle on the door, its latch and its hinges. The opening and closing of the door at frequent intervals also takes additional time which impacts on the efficiency of the work vehicle procedure.

Thus there is a need for a work vehicle having a vehicle door assembly that can open and close in a conventional manner, and be opened and stowed to allow unimpeded ingress and egress to the occupant area of the cab during a work cycle. There is an additional need for a vehicle door that provides a stowage position for the door, that does not impede operator visibility. There is a further need for a vehicle door assembly that, when stowed, will not interfere with or damage other portions of the vehicle or vehicle cab.

SUMMARY OF THE INVENTION

There is provided a vehicle door assembly for a vehicle with the vehicle having a cab frame. The vehicle door assembly comprises a door frame movably coupled to the cab frame. An upper door member is pivotably coupled to the door frame. The lower door member is movably coupled to the upper door member. The door frame is movable from a first position alongside the cab frame to a second position inside the cab frame. The upper door member is movable from a closed position to one of an open position and a stored position inside the cab frame.

There is also provided a vehicle door assembly for a vehicle, with the vehicle having a cab frame defining an access opening into the cab frame. The vehicle door assembly comprises a door frame movably coupled to the cab frame. The door frame has a first sealing surface and a second sealing surface. An upper door panel is pivotally coupled to the door frame. A lower door panel is movably coupled to the upper door panel. The door frame is movable to a stowed position inside the cab frame and the upper door panel is movable to an open position. The vehicle door assembly can include a frame hinge coupled to the door frame and the cab frame with the frame hinge configured to facilitate movement of the door frame into the cab frame. The vehicle door assembly can also include a door hinge coupled to the door frame and the upper door panel with the door hinge configured to facilitate movement of the upper door panel to the open position.

There is further provided a method for stowing a door assembly for a vehicle. The vehicle has a cab frame and a door frame operatively coupled to the cab frame and an upper door panel operably coupled to the door frame with the lower door panel coupled to the upper door panel. The method comprises the steps of pivoting the lower door panel about a storage hinge to a position alongside the upper door panel. Pivoting the door frame about a frame hinge to a stowed position inside the cab frame.

There is provided a door assembly for providing access to an enclosure through an opening therein. The door includes a first door member, a second door member and a means for joining the door members to permit folding of one door member upon the other door member in a generally parallel relationship and permitting the door members to be simultaneously moved from the opening when in the generally parallel relationship.

There is further provided a door assembly for providing access to an enclosure through an opening therein. The door includes a first door member, a second door member, and a door joining system coupled to the door members and the enclosure to permit moving of one door member adjacent to the other door member in a generally parallel relationship and permitting the door members to be simultaneously moved from the opening when in the generally parallel relationship.

DETAILED DESCRIPTION OF THE PREFERRED EMBODIMENTS

Before discussing an exemplary embodiment of a vehicle door assembly 20 of a work vehicle 5, there are a few preliminary comments. When referring to a vehicle 5, it is contemplated that a vehicle 5 can be of at least several different uses and can be referred to a work vehicle 5, a fire-fighting vehicle 5, a crash truck 5, a multi-wheel vehicle 5, a payload carrying vehicle 5, a material hauling vehicle 5, and the like. It is also contemplated that articulated tracks mounted on wheels can be used as support for a support structure of a vehicle 5. The types of payload that the vehicle 5 can carry includes water, such as in a fire-fighting vehicle; pallets, such as in a cargo carrier or loader, bulk materials, such as in a waste hauler or concrete/mixer hauler. The payload is located outside of the cab 10.

Figure 1:
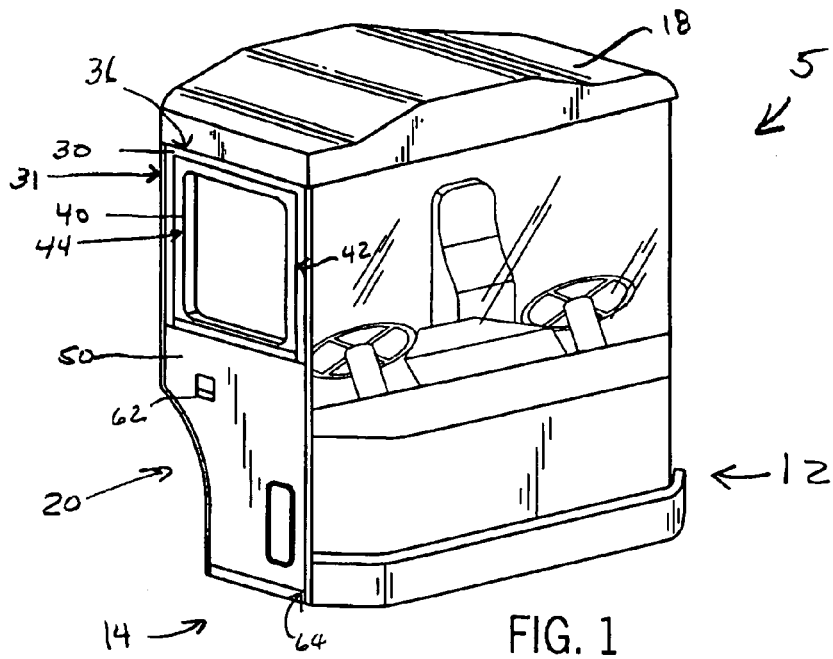
FIG. 1 is a perspective view of an exemplary embodiment of a cab frame for a work vehicle including an exemplary embodiment of a vehicle door assembly mounted on one side of the cab frame, with the door assembly having a door frame in a first position alongside the cab frame and an upper door member in a closed position.
Figure 2:
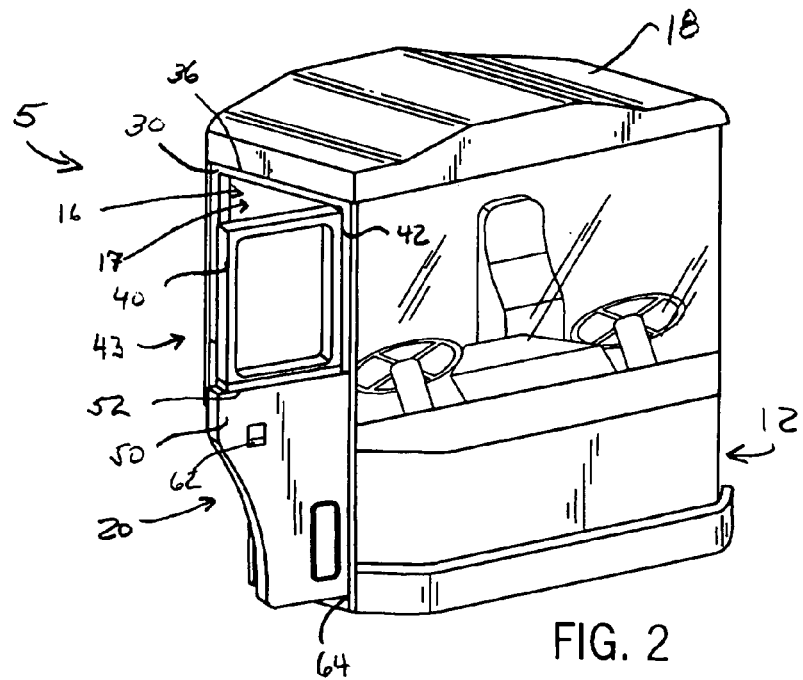
FIG. 2 is a perspective view of the vehicle door assembly illustrated in FIG. 1, with the door frame in the first position alongside the cab frame and the upper door member in an open position.

The vehicle 5 also typically has an are, also referred to as an enclosure, a designated as cab frame 10 defined by a left side 12, a right side 14 and a cab roof 18 mounted on the vehicle support structure. An access opening 16 can be provided in either or both of the left and right 12, 14 sides of the cab frame 10. The driver of the vehicle 5 can operate the vehicle from either side of the cab. The vehicle 5 can also be configured to provide for a steering wheel operable on each side of the cab as illustrated in FIGS. 1 and 2. The interior or inside area 17 of the enclosure or cab frame 10 is accessed through an access opening 16. It is contemplated that any convenient and conventional materials can be utilized for such vehicle portions commensurate with the type of duty that will be experienced by the vehicle. For example, the body can be made out of steel, aluminum, composite materials, or a combination of such or similar materials. The ground engaging motive members, also referred to as wheels can be cast or machined. The wheel arrangement can be a four-wheel, six-wheel (two tandem wheel sets at the rear of the vehicle) and eight-wheel vehicle. At least two of the wheels are steerable and at least two wheels are coupled to a drive apparatus.

Referring to the drawings, FIGS. 1 and 2 illustrate an exemplary embodiment of a vehicle 5, for example a work vehicle. The cab includes a cab frame 10 having a left side 12 and a right side 14 and a cab roof 18. An access opening 16 provides access to the inside area 17 of the cab frame 10. A vehicle door assembly 20 is coupled to the cab frame 10.

The vehicle door assembly 20 includes a door frame 30 which is coupled to the door frame 10. A frame hinge 36 is attached to an upper edge of the door frame 30 and the cab frame 10 for pivotal movement of the door frame 30 into the inside area 17 of the cab frame 10. One embodiment of the door frame 30 is configured as an inverted U-shape and having T-cross section members 31. Such embodiment can be formed from a single piece of material, for example, extruded metal or composite material or it can be formed with three separate pieces fastened together by adhesive, welding or fasteners, such as rivets or both. The door frame 30 can be composed of any suitable and convenient material such as aluminum, steel or a composite material or a combination of such or similar materials. The frame hinge 36 can be any suitable flexible component, for example, a tab and slot, a piano hinge, a plurality of conventional pin hinges or the like. The door frame 30 can also have an actuator, for example a gas cylinder, a biasing component, or the like, which facilitates movement of the door frame 30 into and out of the inside area 17 of the cab frame 10.

An upper door member 40 is operatively coupled to the door frame 30. A door hinge 42 couples the upper door member 40 to the door frame 30. The door hinge 42 can be any suitable flexible component, for example, a piano hinge, a plurality of pin hinges or the like. The upper door member 40 can also be configured to define a window area enclosed by glass or a plastic composite material.

Figure 3:
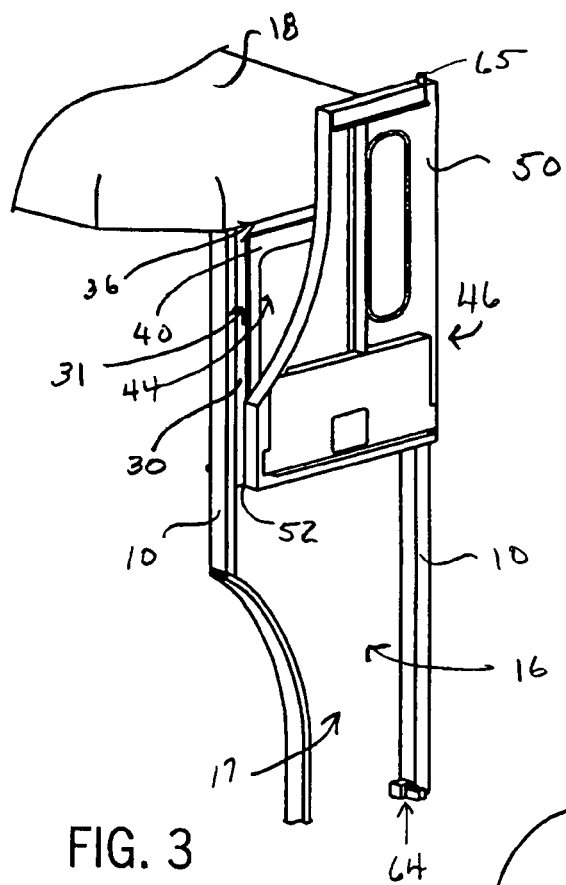
FIG. 3 is a partial, perspective view of an exemplary embodiment of a vehicle door assembly for a cab frame, with a lower door member pivotably coupled to an upper door member and a lower door member in a stowed position alongside the upper door member.
Figure 4:
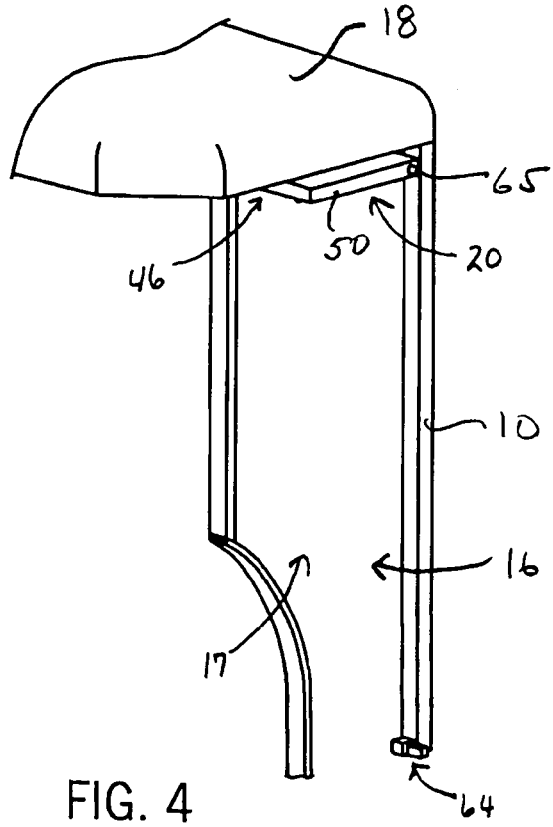
FIG. 4 is a partial, perspective view of the vehicle door assembly illustrated in FIG. 3, with the door frame in a stowed position inside the cab frame.
Figure 5:
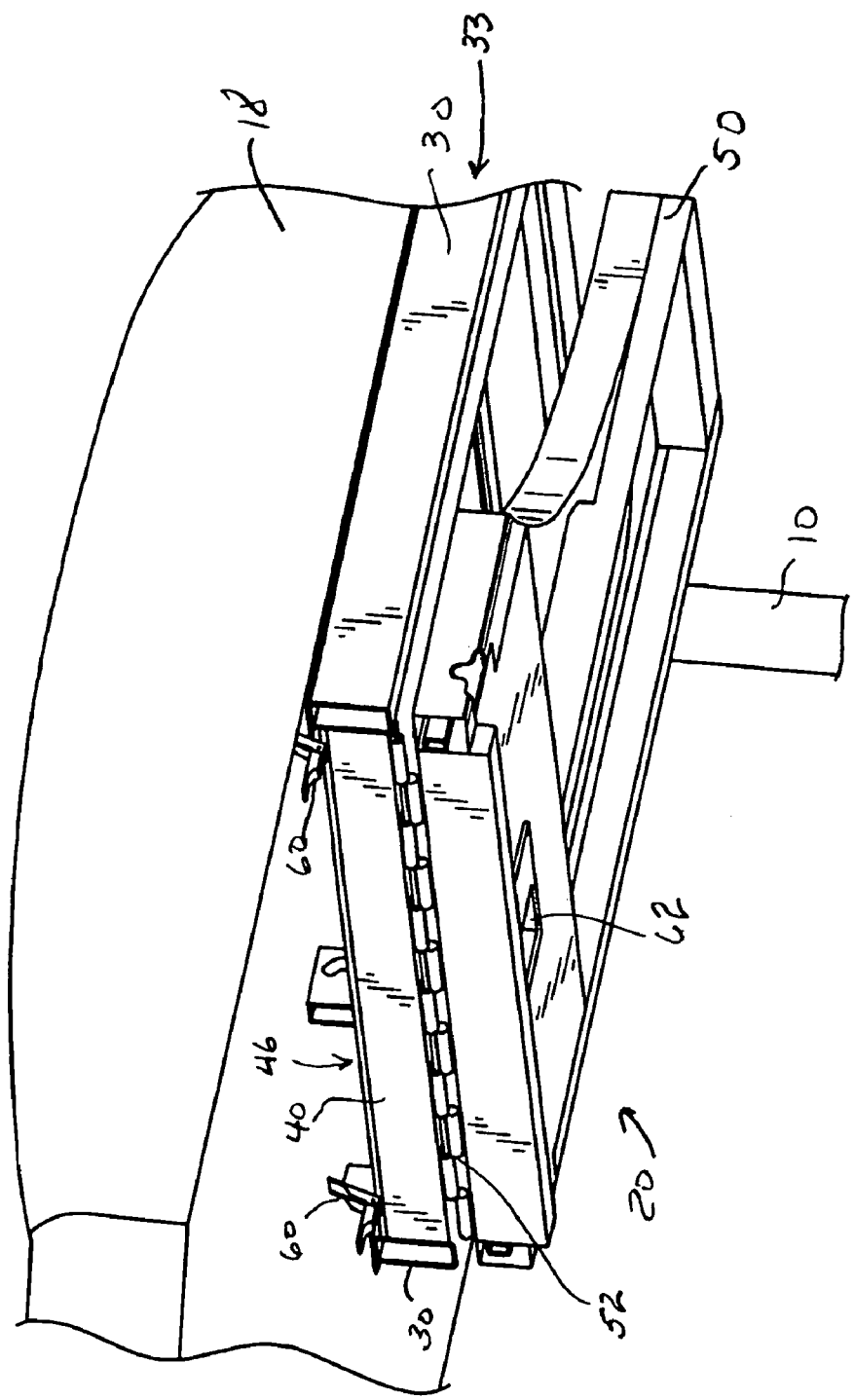
FIG. 5 is a partial perspective view of the vehicle door assembly illustrated in FIG. 4 from inside the cab frame.
Figure 9:
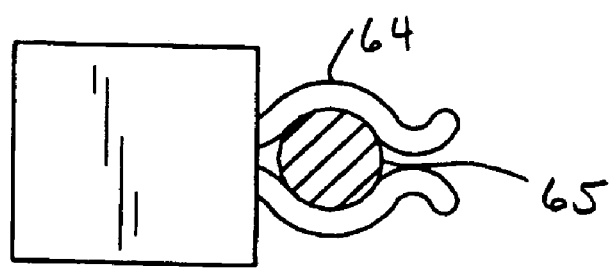
FIG. 9 is a plan view of an exemplary embodiment of a pivot latch illustrated in FIGS. 3 and 4 and coupled to a pivot latch pin as illustrated in FIG. 3.

A lower door member 50 is pivotally coupled to the upper door member 40. A storage hinge 52 is coupled to the upper door member and the lower door member. The storage hinge 52 can be any suitable flexible component, for example, a piano hinge, a plurality of pin hinges or the like. The storage hinge 52 is configured to facilitate movement of the lower door member 50 to a stowed position 46. For the stowed position 46, the lower door member 50 is pivoted or folded, with the storage hinge 52, up along side the upper door member 40 in a generally parallel relationship as shown in FIG. 3 and then the upper door member 40 and lower door member 50 are moved, with the frame hinge 36, into the inside area 17 of the cab frame 10 as illustrated in FIGS. 4 and 5. The lower door member 50 is provided with a pivot latch pin 65 which engages a pivot latch 64 mounted at the bottom of the cab frame 10 corresponding to the lower limit of the access opening 16 of the vehicle cab. The pivot latch 64 and pivot latch pin 65 can be, for example as illustrated in FIG. 9, however, other suitable and convenient releasable pivot assembly can be utilized, for example a sliding pin configured to engage an orifice.

The door frame 30 is movable from a first position 31 along side the cab frame 10 (see FIG. 1) to a second position 33 inside the cab frame 10 (see FIG. 4). The upper door member 40 is movable from a closed position 44 to one of an open position 43 and the stored position 46 inside 17 the cab frame 10 (see FIGS. 1, 2 and 4).

It should also be understood that the lower door member 50 can be configured to slidingly move up alongside either the outside or interior side of the upper door member 40 in a generally parallel relationship before the door assembly 20 is moved to the stowed position 46 inside the cab frame 10. It should also be understood that the door frame 30 can be configured to slidingly move into and out of the inside area 17 of the cab frame 10. The sliding movement of the lower door member 50 and door frame 30 described above can be facilitated by suitable guide rails and rollers or pins mounted on the door members 40, 50, cab frame 10 and door frame 30.

Figure 7:
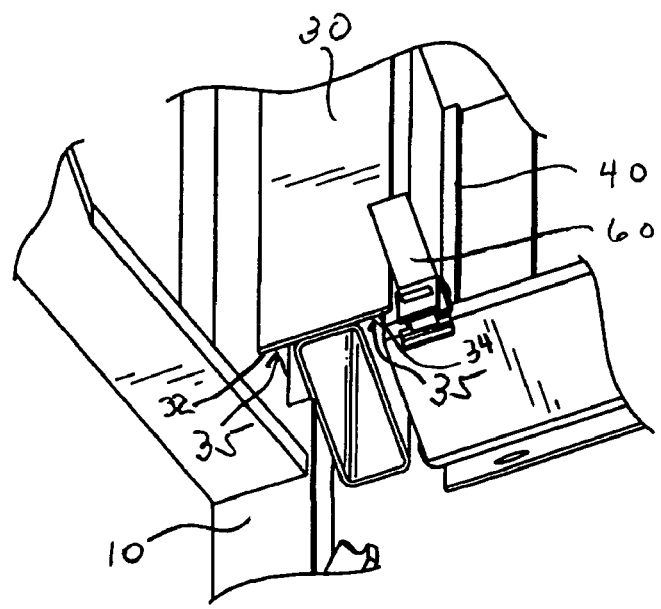
FIG. 7 is a partial perspective detail view of an exemplary embodiment of a door frame in a partially open position from the cab frame and in a closed position with an upper door member forming a gasket seal.
Figure 8:
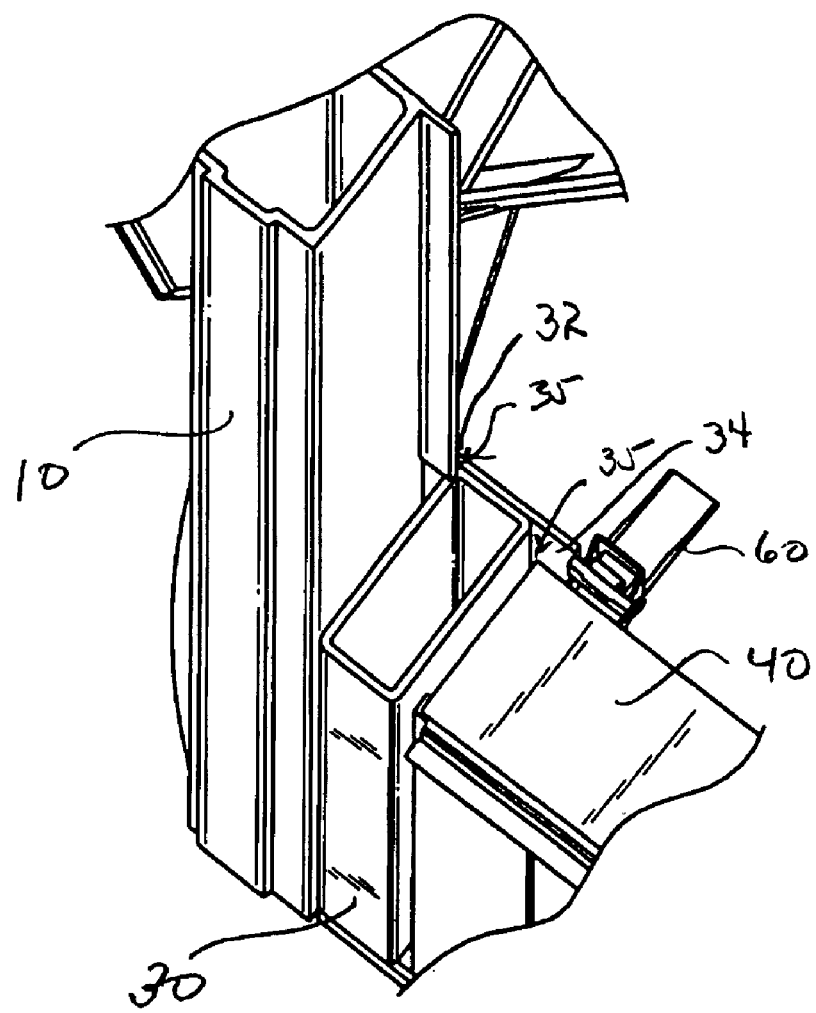
FIG. 8 is a partial perspective detail view of the door frame illustrated in FIG. 7 in a closed position with the cab frame forming a seal with the frame and in a closed position with the upper door member forming a seal.

The door frame 30 includes a first sealing surface 32 and a second sealing surface 34. A gasket seal 35 may be provided on the first and second sealing surfaces, 32, 34. The first sealing surface 32 seals the door frame 30 against the cab frame 10 (see FIGS. 7 and 8) and the second sealing surface 34 seals the upper door panel 40 against the door frame 30 (see FIGS. 7 and 8).

Figure 6:
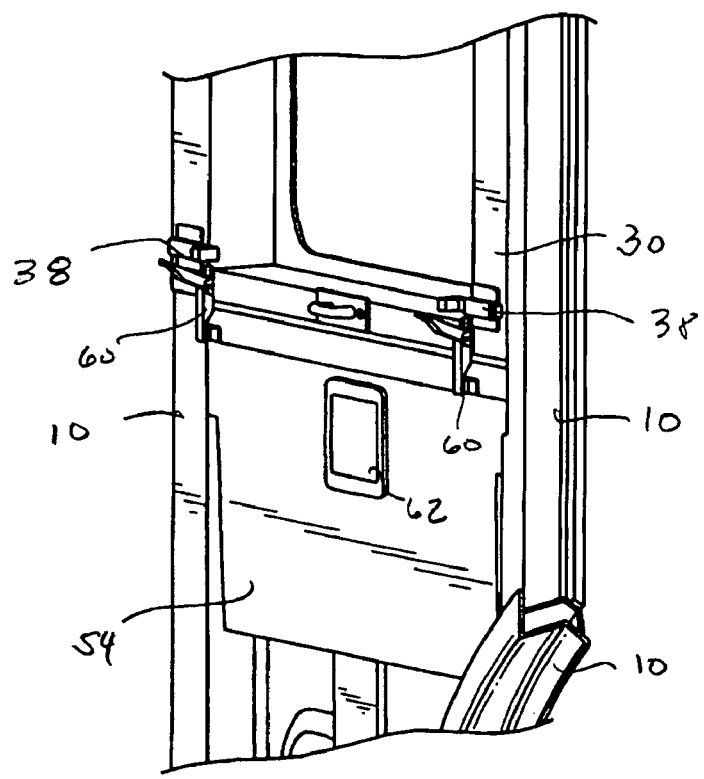
FIG. 6 is a partial perspective view of the vehicle door assembly illustrated in FIG. 1 from inside the cab frame.

A plurality of slam latches 38 are configured to secure the door frame 30 to the cab frame 10 (see FIG. 6). A plurality of over-center latches 60 are configured to secure the upper door member 40 to the lower door member 50 (see FIG. 6). In operation, when an operator desires to stow the vehicle door assembly 20, the over-center latches 60 are released which allows the lower door member 50 to be moved up along side the upper door member 40 as illustrated in FIG. 3. Then the slam latches 38 are released and the door frame 30 can be pivotally moved to the inside area 17 of the cab frame 10 as illustrated in FIGS. 4 and 5. When the vehicle door assembly 20 is configured for conventional door use as illustrated in FIGS. 1 and 2 moving from a closed and open position, the slam latches 38 and the over center latches 60 are in their closed or locked position and a handle latch 62 is used to secure the vehicle door assembly 20 in its closed position (FIG. 1) with the handle latch 62 engaging a notch 66 in the cab frame 10.

Any suitable or convenient trim panels 54 can be provided on the interior portion of either and both the upper and lower door members 40, 50 as selected by the user or manufacturer of the vehicle 5 incorporating the vehicle door assembly 20.

It should also be understood that the vehicle door assembly 20 can be mounted on either the left side 12, or right side 14 of the cab frame 10 and typically is mounted on the designated passenger side of the cab frame. It should be understood that the vehicle door assembly 20 can be on both sides of the cab frame 10 and could be coupled to the cab frame 10 for opening on either the left or right side of the vehicle door assembly 20. It should also be understood that suitable and convenient actuators, such as electric motors, pneumatic cylinders, or linkage assemblies can be utilized to facilitate the movement of the door frame 30, upper door member 40 and lower door member 50 of the vehicle door assembly 20.

A method for storing a door assembly 20 for a vehicle 5 is also disclosed. The vehicle 5 has a cab frame 10 and a door frame 30 operatively coupled to the door frame 10. An upper door panel 40 is operatively coupled to the door frame 30 with the lower door panel 50 coupled to the upper door panel 40. The method includes the steps of pivoting the lower door panel 50 about a storage hinge 52 to a position along side the upper door panel 40 and pivoting the door frame 30 about a frame hinge 36 to a stowed position 46 inside the cab frame 10. The method can include the step of decoupling the lower door panel 50 from the cab frame 10. The method can further include the step of unlatching the door frame 30 from the cab frame 10.

Any references to left and right or front and rear are used as a matter of convenience and are determined by reference to orientation of an operator and passenger when normally sitting facing the forward direction of travel of the vehicle 5 which includes at least one vehicle door assembly 20.

Thus, there is disclosed a vehicle door assembly for a vehicle which provides for the vehicle door to open and close in a conventional manner and also to be configured for storage inside the cab of the vehicle. It should be understood that the changes in the details, materials, steps and arrangements of the parts which have been described and illustrated to explain the nature of the vehicle door assembly will occur to and may be made by those skilled in the art upon the reading of this disclosure. The foregoing description illustrates exemplary embodiments of the vehicle door assembly; however, concepts based upon the description may be employed, in other embodiments without departing from the scope of the appended claims.

What is claimed is:

1. A vehicle door assembly for a vehicle, with the vehicle having a cab frame, the vehicle door assembly comprising:
   a door frame movably coupled to the cab frame;
   an upper door member pivotally coupled to the door frame; and
   a lower door member movably coupled to the upper door member, wherein the upper and lower door members are configured to pivot in a conventional manner in the door frame from the closed position along side the cab frame to the open position parallel to the cab frame, and wherein the door frame is movable from a first position along side the cab frame to a second position inside the cab frame, and the upper door member is movable from a closed position to one of an open position and a stored position inside the cab frame.

2. The vehicle door assembly of claim 1, including a gasket seal coupled to the door frame, upper and lower door members and the cab frame to seal the vehicle door assembly with the cab frame.

3. The vehicle door assembly of claim 1, wherein the upper door member pivots about a door hinge mounted on the door frame.

4. The vehicle door assembly of claim 1 wherein the door frame includes a frame hinge along an upper edge , with the frame hinge coupled to the cab frame for pivotal movement of the door frame into the cab frame.

5. The vehicle door assembly of claim 1, wherein the door assembly is mounted on the passenger side of the cab frame.

6. The vehicle door assembly of claim 5, wherein the passenger side of the cab frame is on the right-hand side of the cab frame.

7. The vehicle door assembly of claim 1, including a pivot latch to couple the lower door member to the cab frame.

8. A vehicle door assembly for a vehicle, with the vehicle having a cab frame defining an access opening into the cab frame, the vehicle door assembly comprising:
   a door frame movably coupled to the cab frame, with the door frame having a first sealing surface and a second sealing surface;
   an upper door panel pivotally coupled to the door frame, in a conventional manner, including a door hinge coupled to the door frame and the upper door panel with the door hinge configured to facilitate movement for the upper door panel; and
   a lower door panel movably coupled to the upper door panel,
   wherein the door frame is movable to a stowed position inside the cab frame and the upper door panel is movable in the conventional manner to an open position.

9. The vehicle door assembly of claim 8, including a frame hinge coupled to the door frame and the cab frame with the frame hinge configured to facilitate movement of the door frame into the cab frame.

10. The vehicle door assembly of claim 8, including a storage hinge coupled to the upper door panel and the lower door panel with the storage hinge configured to facilitate movement of the lower door panel to one of a stowed position and an working position.

11. The,vehicle door assembly of claim 8, wherein the first sealing surface seals against the cab frame.

12. The vehicle door assembly of claim 8, wherein the second sealing surface seals against the upper door panel.

13. The vehicle door assembly of claim 10, wherein the lower door panel is configured to fold up adjacent to the upper door panel in the stowed position.

14. The vehicle door assembly of claim 8, including a releasable pivot latch to couple the lower door panel to the cab frame.

15. The vehicle door assembly of claim 8, including a handle latch coupled to the vehicle door assembly and aligned to engage an associated notch configured in the cab frame.

16. A method for stowing a door assembly for a vehicle, with the vehicle having a cab frame and a door frame operatively coupled to the cab frame, and an upper door panel operably coupled to the door frame in a conventional manner, with a lower door panel coupled to the upper door panel, the method comprising the steps of:
   pivoting the lower door panel about a storage hinge to a position along side the upper door panel; and
   pivoting the door frame about a frame hinge to a stowed position inside the cab frame.

17. The method for stowing a door assembly of claim 16, including the step of decoupling the lower door panel from the cab frame.

18. The method for stowing a door assembly of claim 16, including the step of unlatching the door frame from the cab frame.

19. A door assembly for providing access to an enclosure through an opening therein, the door assembly comprising:

a first door movable about a first axis between an open position and a closed position, and movable about a second axis to a storage position at least partially within the enclosure; and a second door coupled to the first door for movement between the open position and the closed position and for movement to a position generally parallel to the first door for placement in the storage position.

20. The door assembly of claim 19, wherein the first door and the second door are pivotally movable in a generally coplanar arrangement about the first axis between the open position and the closed position.

21. The vehicle door assembly of claim 19, wherein when the doors are in the storage position the doors are generally perpendicular to the opening of the enclosure.

22. The vehicle door assembly of claim 21, wherein the second door is pivotally coupled to the first door for movement from a generally coplanar arrangement to a generally parallel arrangement.

23. A door assembly for providing access to an enclosure through an opening therein, the door comprising:

a first door;

a second door; and a door joining system coupled to the doors and enclosure to permit movement of one said door in a coplanar arrangement with the other said door to open and close the opening and to permit movement of one said door in a parallel arrangement with the other said door to a storage position at least partially within the enclosure wherein when the doors are in the storage position the doors are generally perpendicular to the opening of the enclosure.

24. The door assembly of claim 23, wherein the door joining system is operable to pivot the first door and the second door about a first axis to open and close the opening.

25. The vehicle door assembly of claim 23, wherein the door joining system is operable to pivot one said door into a folded arrangement with the other said door.

26. The vehicle door assembly of claim 23, wherein at least one of the doors is coupled to a frame.

* * * * *